United States Patent [19]
Lynn et al.

[11] Patent Number: 5,785,737
[45] Date of Patent: Jul. 28, 1998

[54] METHOD FOR RECYCLING IRON BEARING SLUDGES IN A STEELMAKING OPERATION

[75] Inventors: John D. Lynn, Center Valley, Pa.; Colvin W. Smith, Catonsville, Md.; Glenn C. Keyser, Freemansburg, Pa.

[73] Assignee: Bethlehem Steel Corporation, Del.

[21] Appl. No.: 835,168

[22] Filed: Apr. 8, 1997

[51] Int. Cl.$^6$ ....................................... C22B 1/00
[52] U.S. Cl. ............... 75/751; 75/746; 75/770; 75/1; 75/3; 75/4; 75/5; 75/24; 75/25
[58] Field of Search ............ 75/751, 746, 770, 75/1, 3, 4, 5, 24, 25

[56] References Cited

U.S. PATENT DOCUMENTS

| | | | |
|---|---|---|---|
| Re. 30,060 | 7/1979 | Kreiger | 75/3 |
| 2,710,796 | 6/1955 | Pinkerton | 75/25 |
| 4,091,545 | 5/1978 | Izawa et al. | 34/9 |
| 4,133,756 | 1/1979 | Arai et al. | 210/67 |
| 4,711,662 | 12/1987 | Harada | 75/1 |
| 4,725,307 | 2/1988 | Harada | 75/10.29 |
| 4,897,201 | 1/1990 | Yamamoto et al. | 210/729 |
| 5,114,474 | 5/1992 | Wilhelm et al. | 5/38 |
| 5,355,594 | 10/1994 | Hwang | 34/356 |
| 5,601,631 | 2/1997 | Rinker et al. | 75/484 |

FOREIGN PATENT DOCUMENTS

| | | |
|---|---|---|
| 59-153848 | 9/1984 | Japan . |
| 9207964 | 5/1992 | WIPO . |

*Primary Examiner*—Patrick Ryan
*Assistant Examiner*—M. Alexandra Elve
*Attorney, Agent, or Firm*—Harold I. Masteller, Jr.

[57] ABSTRACT

The invention is directed to a process for dehydrating wet BOF scrubber sludge to produce a steelmaking revert having an improved flow rate when handled in a recycle stream. Wet sludge is combined with hot BOF slag to provide a slag/sludge mixture. The wet sludge causes the mixture to have a moisture content greater than 10% water by weight, and the hot slag, having a temperature below the molten liquid state, vaporizes the water in the mixture and reduces the moisture content to about 4% water by weight or less. The dehydrated mixture has improved flow rate properties when it is recycled as a steelmaking revert.

28 Claims, 2 Drawing Sheets

METHOD FOR RECYCLING IRON BEARING SLUDGES IN A STEELMAKING OPERATION

BACKGROUND OF THE INVENTION

This invention is related to a method for recycling iron bearing dusts and sludges back into a steelmaking process, and more particularly, it relates to recycling wet BOF scrubber sludge back into the steelmaking process by adding hot slag to reduce the moisture content of the sludge.

It is well known in the art of steelmaking that iron bearing dust and sludges, generated by steelmaking furnaces, are valuable revert materials suitable for recycling back into steelmaking operations. Such waste materials contain iron oxides in an amount up to about 50% by weight, and it is very desirable to recover the iron for use as a steelmaking charge material. However, in the case of wet sludges, and especially in the case of wet BOF scrubber sludge, high moisture content makes the wet sludge very difficult to handle in a recycling stream.

Filter cake produced from wet scrubber sludge typically has a moisture content of about 30% by weight. The high viscosity of such wet sludges causes them to have poor handling characteristics. They stick to conveyors and machinery when attempts are made to convey them as reverts in a recycling stream. They move poorly and often form sticky agglomerations that clog and shutdown equipment and machinery. For example, under test conditions, it has been found that wet sludge having a moisture content of >10% has a flow rate of less than 10 pounds of sludge per minute. Such low flow rates make wet material very unsuitable for recycling as a steelmaking revert.

In instances where waste steelmaking dust is recycled back into the operation, the dry powdery condition of the material causes environmental dusting problems. To control dusting either water is added or the dry material is mixed with wet sludges to eliminate the dusting. However, when various different wet or dry waste materials are combined to produce a steelmaking revert, high levels of undesirable elements and compounds can be introduced into the steelmaking process. For example, if hot dip coating sludge is introduced into the recycling stream, the zinc in the recycling stream can rise to a level where the waste material is unsuitable for use in a steelmaking furnace. Therefore, such combining of steel plant wastes must be carefully monitored for chemistry to avoid introducing deleterious elements into the steelmaking process.

Various apparatus and methods have been developed in the past to reduce the moisture content and/or recover iron from wet sludges. For example, U.S. Reissue Pat. No. 30,060 teaches a process that instantaneously vaporizes the water in sludge by spraying the sludge into a hot (1200° F.) gas stream. U.S. Pat. Nos. 4,091,545, and 4,133,756 also teach using a hot gas to reduce the moisture content of wet sludge.

U.S. Pat. Nos. 5,114,474, 4,725,307, 4,711,662 and 2,710,769, teach mixing wet sludges and dust with molten slag to produce reverts. The mixture is crushed for recycling after the slag cools and solidifies.

An article in "33 METALPRODUCING," March 1997, discloses a process that forms BOF waste sludge into briquettes. The apparatus used in the process includes a rotary kiln or dryer to remove water from the sludge, a roll-press, screw conveyors and pug mills. Such recycling plants require large capital investments. The use of a rotary kiln consumes expensive energy to generate heat for drying the sludge. The article also discloses using heated molasses as a binder to form the briquettes. The heated molasses also adds cost to the recycling process.

Therefore, as shown in the patents, it is well known within the steelmaking art that steelmaking sludges and dusts can be processed and recycled as a valuable revert. It is also well recognized that wet sludges flow poorly and create logistical problems within a recycling stream because of their poor flow rate properties. The patents also teach that dry steelmaking waste materials present dusting problems during recycling. And finally, the above patents teach solving these well known problems by dehydrating wet sludges with hot gases to produce a suitable sinter or charge material. The current state-of-the-art requires complex recycling facilities and hot gas blowers that consume large amounts of expensive energy to dry wet sludges. The hot gas vaporizes the water in the wet sludge and reduces the moisture content of the sludge to a level where the sludge can be used as a steelmaking revert.

SUMMARY OF THE INVENTION

Therefore, the primary object of the disclosed invention is to provide a process for treating wet steelmaking sludges to produce a steelmaking revert having improved flow rate properties in a recycling stream. The process includes the steps of combining wet sludge and hot slag into a hot slag/sludge mixture; resting the hot slag/sludge mixture for a period of time to allow the hot slag to cause water vaporization and reduce the moisture content of the slag/sludge mixture to less than 10% by weight. The dehydrated slag/sludge mixture is recycled as a steelmaking revert.

These and other objects and advantages of the invention will be readily apparent in view of the following description and drawings.

DETAILED DESCRIPTION OF THE PREFERRED EMBODIMENT

Figure 1:
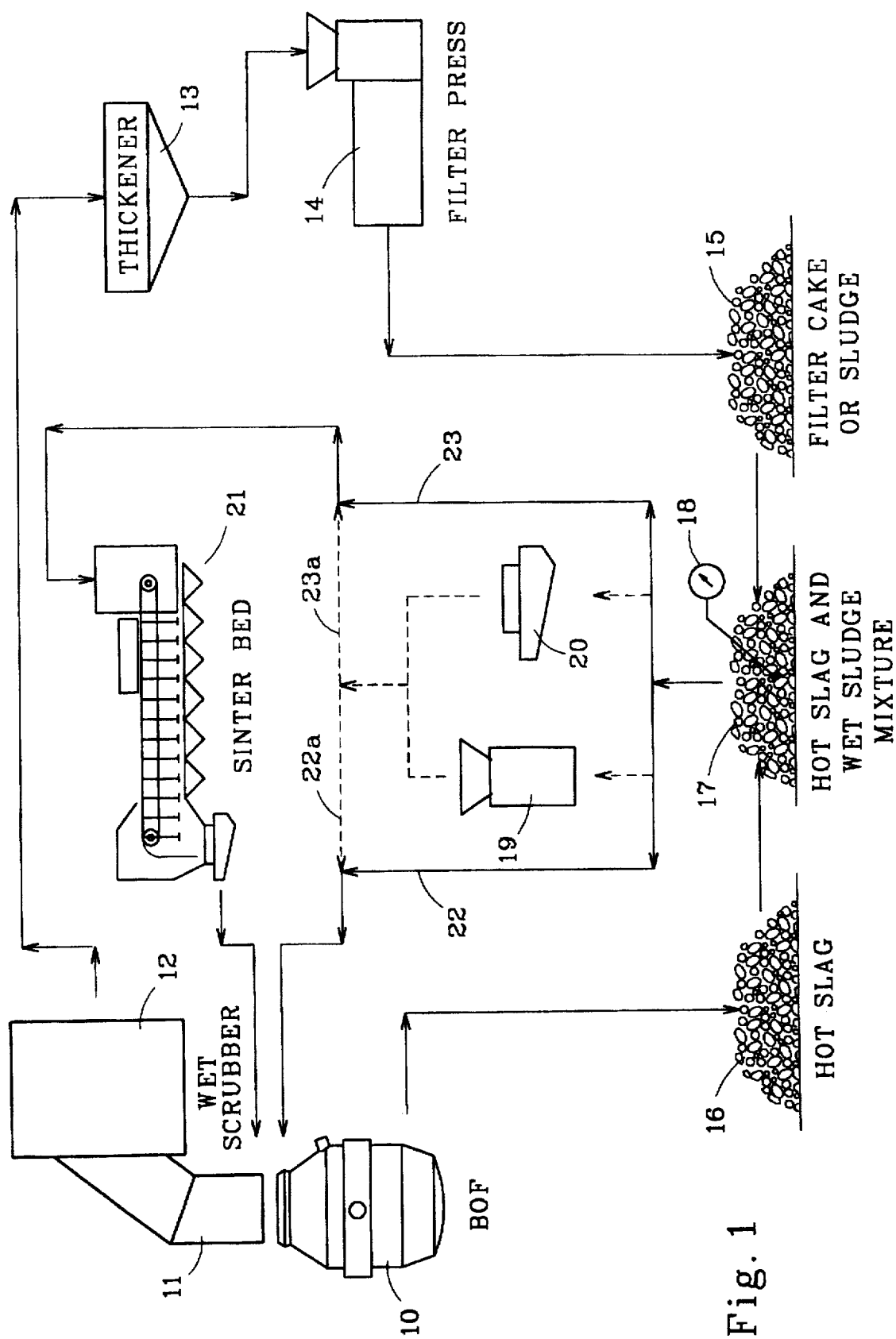
FIG. 1 is a flow diagram illustrating the steps of the process for treating wet steelmaking sludge to produce a steelmaking revert.

Referring to FIG. 1 of the drawings, modern steelmaking pollution control devices such as bag houses, precipitators, cyclones and scrubbers generate large quantities of iron bearing dusts and sludges. Such waste materials have a high value as a revert for charging back into the steelmaking furnaces. However, many of these waste materials are very high in water content due to the wet environmental processes, such as wet scrubbers, that are used to control steelmaking emissions.

In the preferred embodiment, FIG. 1 shows a basic oxygen furnace (BOF) 10 and hood 11 positioned above the mouth of the BOF to collect fume and gas that is emitted during the steel refining process. The fume and hot gasses are collected in a wet scrubber 12 and the wet scrubber sludge is sent to a thickener 13 where water is removed. A further downstream step in the recycling process typically includes either batch or continuous filtration of the wet sludge. This filtering step is carried out in press 14 where a wet filter cake 15 is produced. The filter cake, or sludge, has a moisture content of about 30% water by weight.

As heretofore mentioned, wet BOF sludge contains iron oxides in amounts of up to about 50% by weight, and it is very desirable to recover the iron for reuse as a charge material in the steelmaking operation. However, the high viscosity of the wet sludge makes it very difficult to handle the material as a steelmaking revert. It has been discovered that if the moisture content of the wet sludge can be reduced to less than about 10% water by weight, the flow rate properties of the sludge is improved to where the sludge can be conveniently handled as a steelmaking revert. Is has also been discovered that a preferred moisture content of between about 3%–4% water produces a superior sludge flow rate as a revert.

Figure 2:
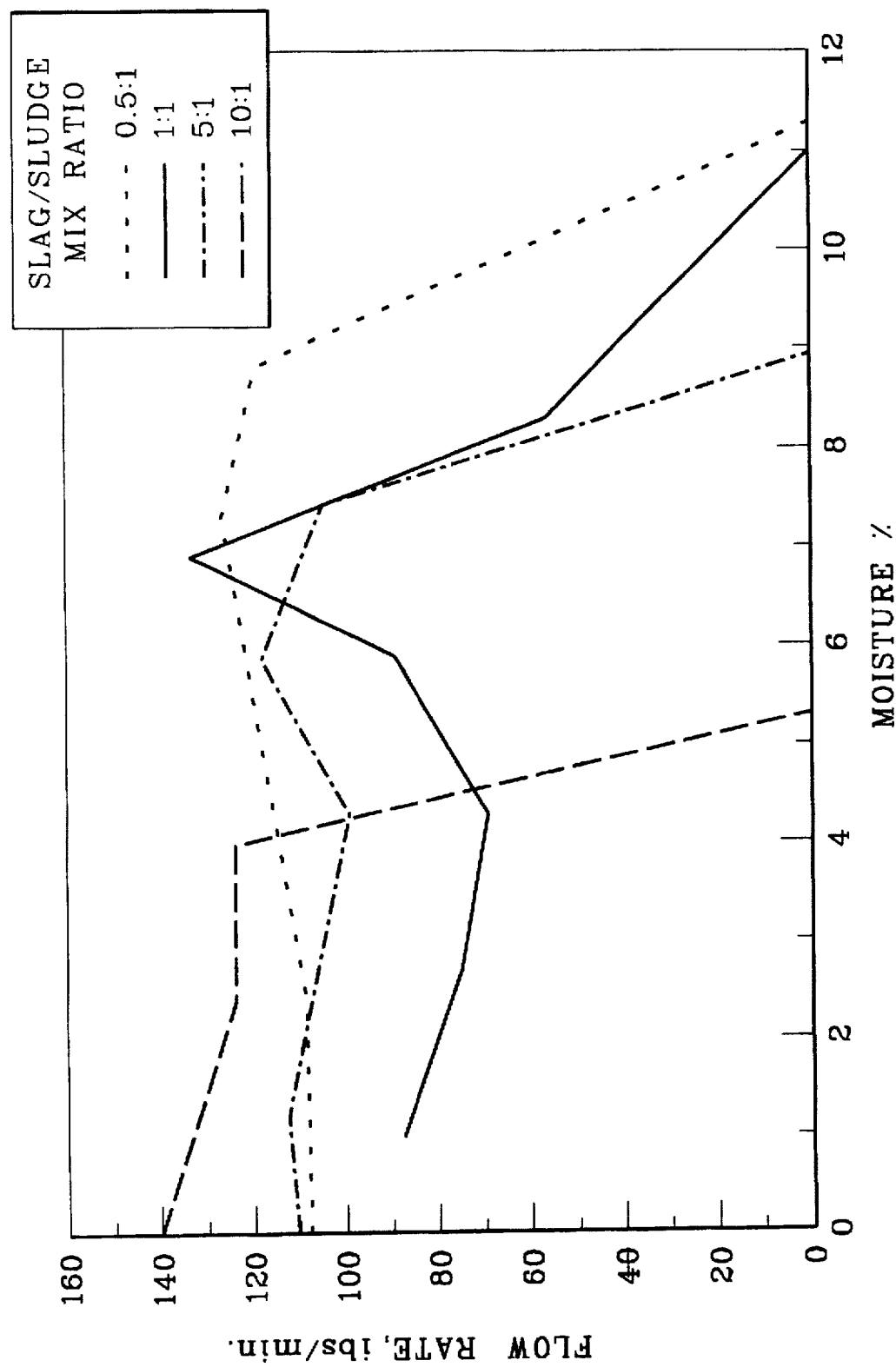
FIG. 2 is a graph showing flow rate measurements in relation to sludge moisture content.

For example, in the graph shown in FIG. 2, flow rate is plotted against the moisture content of four different mixture ratios ranging from a slag/sludge ratio of 0.05:1 up to a ratio of 10:1. The flow rate tests were conducted in a 2 cubic foot bin having a 65° sloped floor to discharge the slag/sludge mixture through a 2½ square inch opening in the bin. The plotted data in FIG. 2 clearly shows that at a preferred 1:1 ratio, the slag/sludge flow rate decreases rapidly when the moisture content of the mixture exceeds 7% water by weight. Above about an 8% water content the flow rate of the material is considered only marginally acceptable, and above 10% the material flow rate is unacceptable. Above 10%, the flow rates become very poor, and at a moisture content above 11% or higher there is no material flow.

It can be seen that in order to use wet BOF sludge as a revert in a steelmaking process, it is necessary to first reduce the moisture content of the wet sludge to a level where the water in the sludge is less than 10% by weight. And as clearly shown in FIG. 2, the water level for all four tested mix ratios should be reduced to a preferred range of between about 3%–4% to achieve optimum flow rates as shown in the plotted data. It has also been discovered, during actual use in a pilot test, that when the moisture content of the wet sludge material falls to a level below 3% dusting can become a problem. If this happens, water must be added to the slag/sludge mixture to bring the moisture content back up into the preferred 3%–4% moisture range to eliminate dusting.

Dehydrating wet sludge is extremely energy intensive. The prior patents disclose sludge drying operations that consume large amounts of energy to generate heat for vaporizing the water in the sludge. It has been discovered that hot slag, at a temperature below the molten liquid state, provides a free heat source that can be combined with the wet BOF sludge to vaporize the water and lower the moisture content of the sludge.

As heretofore disclosed, the prior patents teach mixing molten slag with steelmaking dusts and sludges to recover iron from steelmaking waste. Such practice is extremely dangerous. Mixing molten slag with water can cause terrifying explosions. In the past, such explosions at steelmaking operations have resulted in injury and death to employees. The prior patents even warn of this problem. For example, Pinkerton discloses, in U.S. Pat. No. 2,710,796, that "Excessive water, however, must be avoided; the generation of steam is too violent . . ." Explosive conditions are completely avoided when hot, not molten, slag is combined with wet sludge to drive off water from the sludge.

Referring again to FIG. 1, hot slag from supply 16 is combined with wet sludge from supply 15 to form a hot slag, wet sludge mixture at 17. The preferred and most convenient method for combining the hot slag and wet sludge is to blend alternating batches taken from the supplies 15 and 16. This produces the preferred 1:1 slag/sludge mixture ratio. However, it has been discovered that careful blending of the hot slag and wet filter cake or sludge is required to avoid rapid steam generation. The procedure developed to avoid rapid steam generation involves combining the materials into a stratum comprising alternating 1–2 feet thick layers of slag and wet filter cake or sludge. This procedure allows for safe evolution of steam and uniform drying of the filter cake or sludge. Reclaiming the layered pile 17 after curing for about 16 hours results in a uniform blend of the two materials suitable for any down stream processing, i.e., crushing screening, and/of magnetic separation. This procedure is readily done with front end loader bucket used at most slag processing sites in the steel industry.

The slag/sludge mix rate can be changed to produce slag/sludge ratios up to about 10:1 or down to about 0.5:1. However, when the slag/sludge ratio is changed to increase the slag content in the mixture the metallurgical impact on finished product quality must be considered. It must be remembered that slag additions reintroduce removed impurities back into the steelmaking vessel. For example, in most instances, phosphorus is considered detrimental with respect to the quality of steel products. Metallurgists attempt to entrap phosphorus, and other impurities, within the slag cover that floats on the surface of the molten steel bath contained in a steelmaking vessel. These impurities are removed from the molten steel as the slag is systematically tapped.

Table A shows the chemistry for a 1:1 slag/sludge mixture combined from BOF slag and BOF scrubber sludge. The table shows that the slag contains about 0.7% phosphorus by weight and the sludge contains about 0.06% phosphorus. The resulting combined mixture has about 0.3% phosphorus at a 1:1 slag/sludge mixture ratio. This is an acceptable phosphorus level for BOF charge material. If the 1:1 mixture ratio is changed to increase slag content the phosphorus level will increase. For example, if the slag taken from supply 16 is combined with sludge from supply 15 at a 2:1 slag/sludge ratio the slag/sludge mixture will contain about 0.49% P, at a 5:1 ratio the mixture will contain about 0.59% P, and at a 10:1 ratio it will contain about 0.64% phosphorus.

TABLE A

| | SLAG/SLUDGE 1:1 RATIO CHEMICAL ANALYSIS | | |
|---|---|---|---|
| Symbol, % db | Slag/Sludge | BOF Slag | BOF Sludge |
| Fe | 41.0 | 21.4 | 60.9 |
| Mn | 2.1 | 3.5 | 0.86 |
| P | 0.3 | 0.7 | 0.06 |
| Zn | 0.9 | — | 1.4 |
| $SiO_2$ | 6.9 | 12.5 | 1.4 |
| CaO | 20.4 | 46.0 | 4.6 |
| MgO | 6.7 | 5.6 | 1.6 |
| $Al_2O_3$ | 1.0 | 1.1 | 0.1 |
| $TiO_2$ | 90.3 | — | 0.06 |

Various other undesirable elements and compounds can be inadvertently introduced into the recycling stream when different waste materials found throughout a steelmaking operation are added to the slag/sludge mixture. In the above instance we show that the slag/sludge mixture contains an acceptable 0.3% phosphorus level. However if hot-dip and tin mill sludges were added to the slag/sludge mixture, the zinc and chrome levels of the mixture would increase. Excessive amounts of either zinc or chrome could have deleterious effects on the steel. Therefore, it is readily seen that steelmakers must carefully monitor revert chemistries in consideration of end use to avoid introducing undesirable impurities into finished steel products.

The slag/sludge mixture shown at 17 is allowed to rest or cure for an extended time period to enable the radiant energy emitted from the hot slag to vaporize water in the sludge, and reduce the total water content of the mixture to less than about 10% by weight. The water content of the slag/sludge is monitored with meters 18 to determine when the moisture content of the mixture falls below the 10% level. Actual pilot plant operations have shown that the slag/sludge mixture should be allowed to rest or cure for a time period of up to about 16 hours to vaporize a sufficient amount of water to reduce the moisture content to the preferred 3%–4% moisture level.

After the slag/sludge mixture is dehydrated to the desired 3%–4% moisture range its flow rate properties are improved, and it is sent downstream for additional processing. These additional processing steps can include magnetic separation 19, screening 20 and/or sintering 21. In mixtures that contain high zinc levels of about 0.9% and above, the mixture is not considered suitable for use in a sinter bed operation 21, and such slag/sludge mixtures are charged directly into the BOF with or without magnetic separation and/or screening as shown by lines 22 and 22a. In slag/sludge mixtures where the zinc concentration is lower than about 0.9% by weight, the mixture can be added to the sinter bed 21 with or without magnetic separation and/or screening as shown by lines 23 and 23a. However, it should be understood that low zinc level slag/sludge mixtures can be charged directly into a BOF without sintering.

It has been discovered that fine particles, about 20 mesh (~0.03 in.), in the reclaimed slag/sludge mixture that has particles ranging up to about 0.5 inch in size, can present a problem if the slag/sludge revert is charged directly into a BOF. It has also been discovered that such fine particles can be feed directly into a sinter plant without presenting any known problems in the sintering operation. When the smaller 20 mesh slag/sludge fines are charged directly into a BOF they are carried out of the vessel with the off gases. This overloads the gas cleaning scrubber system and negates the recycling effort.

In order to solve this problem, lime can be added to the wet filter cake or sludge 15 in an amount of about 1% by weight. It is believed that the lime addition causes micro-pelletization of the slag/sludge fines during crushing and screening operations down stream from the blending process shown at 17. The many conveyor to conveyor transfer points, and the various water sprays located throughout a recycling operation, cause the lime to act as a binder and enhance agglomeration of the slag/sludge fines into micro-pellets. This reduces the amount of 20 mesh fines within the dried slag/sludge mixture and makes the revert more suitable for charging directly into a BOF vessel.

Under actual plant conditions the lime blended and agglomerated slag/sludge mixture was charged into a BOF without any noticeable increase of fines in the off gases. The lime blending technique also reduced dusting problems during handling and charging of the blended material. As a result, the moisture content of the slag/sludge mixture can be further reduced to a preferred range of between about 2%–4% water by weight when lime additions are blended with the filter cake.

It should be understood that this process in not limited to steelmaking operations. Any hot dross can be used as a heat source to dehydrate wet sludge produced in any metal refining or smelting operation, and that such dross/sludge mixtures can be recycled back into their respective refining or smelting operations.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

I claim:

1. A process for dehydrating wet sludge to produce a revert having an improved flow rate when handled in a recycle stream, the steps of the process comprising:

a) combining said wet sludge with hot slag to provide a slag/sludge mixture having a moisture content >10% water by weight, said hot slag having a temperature below the molten liquid state;

b) discontinuing said step combining said wet sludge and said hot slag and resting said slag/sludge mixture for a time period to enable radiant energy emitted from said hot slag to vaporize water in said slag/sludge mixture and reduce said moisture content to <10% water by weight; and c) recycling said slag/sludge mixture as a revert having a reduced moisture content of <10% water by weight, said reduced moisture content improving the flow rate of said slag/sludge mixture revert.

2. The process recited in claim 1 wherein said wet sludge is filtered prior to the step combining said wet sludge and said hot slag to provide a sludge filter cake having a moisture content of >10% water by weight.

3. The process recited in claim 1 wherein said wet sludge is BOF scrubber sludge.

4. The process recited in claim 3 wherein said BOF scrubber sludge is combined with selected steelmaking waste sludges not generated in a BOF operation.

5. The process recited in claim 3 wherein said BOF scrubber sludge is combined with selected steelmaking waste dust.

6. The process recited in claim 3 wherein said BOF scrubber sludge is combined with selected steelmaking waste sludges not generated in a BOF operation, and with selected steelmaking waste dust.

7. The process recited in claim 1 wherein said slag/sludge mixture revert is charged into a BOF.

8. The process recited in claim 7 wherein lime is added to said wet sludge during said combining step prior to resting said slag/sludge mixture to reduce moisture content.

9. The process recited in claim 8 wherein said moisture content is reduced to about ≦4% water by weight.

10. The process recited in claim 1 wherein said slag/sludge mixture revert is sintered prior to charging into a furnace.

11. The process recited in claim 1 wherein said reduced moisture content is less than about 4% water by weight.

12. The process recited in claim 1 wherein said flow rate is improved to at least 50 pounds per minute when said slag/sludge mixture is moved along a 65° incline.

13. The process recited in claim 1 wherein said slag/sludge mixture is combined at a slag/sludge ratio is ≦10:1.

14. The process recited in claim 11 wherein said slag/sludge ratio is 1:1 and said reduced moisture content is about ≦4% water by weight.

15. The process recited in claim 1 wherein said slag/sludge mixture is rested for a time period of at least 16 hours to enable radiant energy emitted from said hot slag to vaporize water in said slag/sludge mixture.

16. A process for producing a revert from a wet sludge comprising:
   a) combining said wet sludge with a hot dross, said hot dross having a temperature below the molten liquid state;
   b) discontinuing said step combining said wet sludge and said hot dross and resting said dross/sludge mixture for a time period to enable radiant energy emitted from said hot dross to vaporize water in said dross/sludge mixture; and
   c) recycling said dross/sludge mixture as a revert having a reduced moisture content, said reduced moisture content improving flow rate of said dross/sludge mixture in a recycling stream.

17. The process recited in claim 16 wherein said wet sludge is filtered prior to the step combining said wet sludge and said hot dross to provide a sludge filter cake combined with said hot dross.

18. The process recited in claim 16 wherein said dross/sludge mixture has a reduced moisture content of about ≦4% water by weight.

19. The process recited in claim 16 wherein said flow rate is improved to at least 50 pounds per minute when said dross/sludge mixture is moved along a 65° incline.

20. The process recited in claim 16 wherein said dross/sludge mixture is combined at a dross/sludge ratio ≦10:1.

21. The process recited in claim 20 wherein said dross/sludge ratio is 1:1 and said reduced moisture content is about ≦4% water by weight.

22. The process recited in claim 16 wherein said dross/sludge mixture is rested for a time period of at least 16 hours to enable radiant energy emitted from said hot dross to vaporize water in said dross/sludge mixture.

23. A process for treating wet steelmaking sludges to produce a steelmaking revert having improved flow rate properties in a recycling stream, the steps of the process comprising:
   a) combining wet sludge with hot slag, said hot slag having a temperature below the molten liquid state, to form a hot slag/sludge mixture;
   b) resting said hot slag/sludge mixture for a period of time to allow said hot slag to cause water vaporization, said water vaporization reducing moisture content of said slag/sludge mixture to less than 10% by weight and thereby providing improved flow rate properties; and
   c) recycling said slag/sludge mixture as a steelmaking revert.

24. The process recited in claim 23 wherein said slag/sludge mixture has a reduced moisture content is about ≦4% water by weight.

25. The process recited in claim 23 wherein said flow rate is improved to at least 50 pounds per minute when said slag/sludge mixture is moved along a 65° incline.

26. The process recited in claim 23 wherein said slag/sludge mixture is combined at a slag/sludge ratio is ≦10:1.

27. The process recited in claim 26 wherein said slag/sludge ratio is 1:1 and said reduced moisture content is about ≦4% water by weight.

28. The process recited in claim 23 wherein said slag/sludge mixture is rested for a time period of at least 16 hours to enable radiant energy emitted from said hot dross to vaporize water in said slag/sludge mixture.

* * * * *